(12) United States Patent
Ravi

(10) Patent No.: US 11,443,313 B2
(45) Date of Patent: Sep. 13, 2022

(54) METHODS AND SYSTEMS FOR AUTHORIZING A REAL-TIME TRANSACTION WITH A THIRD PARTY PLATFORM

(71) Applicant: HONDA MOTOR CO., LTD., Tokyo (JP)

(72) Inventor: Narendran Ravi, Torrance, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 292 days.

(21) Appl. No.: 16/025,684

(22) Filed: Jul. 2, 2018

(65) Prior Publication Data

US 2020/0005305 A1    Jan. 2, 2020

(51) Int. Cl.
| | |
|---|---|
| *G06Q 20/40* | (2012.01) |
| *H04L 9/40* | (2022.01) |
| *G06Q 20/38* | (2012.01) |
| *G06Q 20/02* | (2012.01) |

(52) U.S. Cl.
CPC ......... *G06Q 20/4012* (2013.01); *G06Q 20/02* (2013.01); *G06Q 20/3829* (2013.01); *H04L 63/0435* (2013.01)

(58) Field of Classification Search
CPC .... G06Q 20/40; G06Q 20/4012; G06Q 20/02; G06Q 20/3829; H04L 63/0435; H04L 67/12; H04L 29/06; H04W 12/06
See application file for complete search history.

(56) References Cited

U.S. PATENT DOCUMENTS

| | | | |
|---|---|---|---|
| 7,917,253 B2 | 3/2011 | Inbarajan et al. | |
| 8,650,625 B2* | 2/2014 | Grandcolas | H04L 9/0825 726/5 |
| 8,954,218 B2 | 2/2015 | Petersen et al. | |
| 9,014,910 B2* | 4/2015 | Grau | G07C 5/008 701/29.2 |

(Continued)

OTHER PUBLICATIONS

Car Connectivity Consortium (CCC). "Building Digital Key Solution for Automotive", pp. 1-8, Jun. 2018. (Year: 2018).*

(Continued)

*Primary Examiner* — Jacob C. Coppola
*Assistant Examiner* — Timothy Paul Sax
(74) *Attorney, Agent, or Firm* — ArentFox Schiff LLP

(57) ABSTRACT

Systems and methods for authorizing a real-time transaction with a third party platform (TPP). The system includes a memory that stores instructions for authorizing the real-time transaction with the TPP. The system also includes a processor configured to execute the instructions. The instructions cause the processor to: generate a tokenized personal identification number (PIN) based on a request to register with the TPP, the request including a customer PIN and an authorization token; transmit the tokenized PIN and the authorization token to the TPP, wherein the TPP stores the tokenized PIN and the authorization token; in response to receipt, at the TPP, of a request for the real-time transaction from a customer, receive the tokenized PIN from the TPP; decrypt the tokenized PIN to extract the customer PIN; and transmit instructions including the customer PIN to a service provider, the instructions comprising a command to provide access to a vehicle.

20 Claims, 4 Drawing Sheets

(56) References Cited

U.S. PATENT DOCUMENTS

| | | | |
|---|---|---|---|
| 9,111,296 B2 | 8/2015 | Gorpynich et al. | |
| 9,130,647 B2 | 9/2015 | Yarnold et al. | |
| 9,189,900 B1* | 11/2015 | Penilla | G06Q 20/308 |
| 9,313,661 B2 | 4/2016 | Eling et al. | |
| 9,367,968 B2 | 6/2016 | Giraud et al. | |
| 9,672,025 B2 | 6/2017 | Martin et al. | |
| 9,767,697 B2 | 9/2017 | Rockett et al. | |
| 9,865,110 B2 | 1/2018 | Link, II | |
| 2013/0086382 A1* | 4/2013 | Barnett | H04L 9/3226 713/168 |
| 2013/0132286 A1* | 5/2013 | Schaefer | G06Q 10/06 705/305 |
| 2015/0024688 A1* | 1/2015 | Hrabak | H04W 4/80 455/41.2 |
| 2015/0081858 A1 | 3/2015 | Gel | |
| 2015/0178515 A1* | 6/2015 | Cooley | H04L 63/083 713/155 |
| 2016/0219059 A1* | 7/2016 | Park | G06F 21/42 |
| 2016/0232607 A1* | 8/2016 | Spielman | G06Q 40/08 |
| 2016/0274882 A1 | 9/2016 | Fazi | |
| 2017/0011572 A1 | 1/2017 | Link, II | |
| 2017/0063994 A1 | 3/2017 | Lei et al. | |
| 2017/0161973 A1* | 6/2017 | Katta | G06Q 40/08 |
| 2019/0027137 A1* | 1/2019 | Sohn | G10L 15/26 |
| 2019/0034924 A1* | 1/2019 | Prabhu | G06Q 20/3821 |
| 2019/0058728 A1* | 2/2019 | Datta | H04L 63/1441 |
| 2019/0392431 A1* | 12/2019 | Chitalia | G07G 1/0009 |
| 2020/0062215 A1* | 2/2020 | Schuller | G05D 1/0011 |
| 2020/0211002 A1* | 7/2020 | Steinberg | G06Q 20/385 |

OTHER PUBLICATIONS

ACEA. "ACEA Position Paper: Access to vehicle data for third-party services", European Automobile Manufacturers Association, Dec. 2016. (Year: 2016).*

Iraklis Symeonidis et. al., "Keyless car sharing system: A security and privacy analysis", 2016 (Year: 2016).*

Spaan, R., et al.,"Secure Updates in Automotive Systems," Radboud University, pp. 1-71, 2016.

* cited by examiner

METHODS AND SYSTEMS FOR AUTHORIZING A REAL-TIME TRANSACTION WITH A THIRD PARTY PLATFORM

TECHNICAL FIELD

The present disclosure generally relates to methods and systems for authorizing a real-time transaction with a third party platform (TPP).

BACKGROUND

Third party platforms (TPPs) may be vendors that provide a service or a real-time transaction to a vehicle that requires access to the vehicle, such as accessing the vehicle to deliver a parcel, wash the vehicle, fuel, or charge the vehicle. To achieve this, the TPPs may require another provider, such as a telematics service provider (TSP), to provide access to the vehicle. However, customers may be required to enter a personal identification number each time a request for a service is submitted.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In one aspect, the present disclosure relates to a system that includes a memory that stores instructions for executing processes that may authorize a real-time transaction with a third party platform. The system may also include a processor configured to execute the instructions. The instructions may cause the processor to: generate a tokenized personal identification number (PIN) based on a request to register with the TPP, the request including a customer PIN and an authorization token; transmit the tokenized PIN and the authorization token to the TPP, wherein the TPP stores the tokenized PIN and the authorization token; in response to receipt, at the TPP, of a request for the real-time transaction from a customer, receive the tokenized PIN from the TPP; decrypt the tokenized PIN to extract the customer PIN; and transmit instructions including the customer PIN to a service provider, the instructions comprising a command to provide access to a vehicle.

In a further aspect, the present disclosure relates to a method for authorizing a real-time transaction with a third party platform. The method may include: generating a tokenized personal identification number (PIN) based on a request to register with the TPP, the request including a customer PIN and an authorization token; transmitting the tokenized PIN and the authorization token to the TPP, wherein the TPP stores the tokenized PIN and the authorization token; in response to receipt, at the TPP, of a request for the real-time transaction from a customer, receiving the tokenized PIN from the TPP; decrypting the tokenized PIN to extract the customer PIN; and transmitting instructions including the customer PIN to a service provider, the instructions comprising a command to provide access to a vehicle.

In a further aspect, the present disclosure relates to a non-transitory computer-readable storage medium containing executable computer program code. The code comprises instructions that may cause a processor to: generate a tokenized personal identification number (PIN) based on a request to register with the TPP, the request including a customer PIN and an authorization token; transmit the tokenized PIN and the authorization token to the TPP, wherein the TPP stores the tokenized PIN and the authorization token; in response to receipt, at the TPP, of a request for the real-time transaction from a customer, receive the tokenized PIN from the TPP; decrypt the tokenized PIN to extract the customer PIN; and transmit instructions including the customer PIN to a service provider, the instructions comprising a command to provide access to a vehicle.

BRIEF DESCRIPTION OF THE DRAWINGS

The novel features believed to be characteristic of aspects of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

A "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols, such as Controller Area network (CAN), Local Interconnect Network (LIN), among others.

A "memory," as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

An "operable connection," as used herein may include a connection by which entities are "operably connected," is one in which signals, physical communications, and/or logical communications may be sent and/or received. An operable connection may include a physical interface, a data interface and/or an electrical interface.

A "vehicle," as used herein, refers to any moving vehicle that is powered by any form of energy. A vehicle may carry human occupants or cargo. The term "vehicle" includes, but is not limited to: cars, trucks, vans, minivans, SUVs, motorcycles, scooters, boats, personal watercraft, and aircraft. In some cases, a motor vehicle includes one or more engines.

Figure 1:
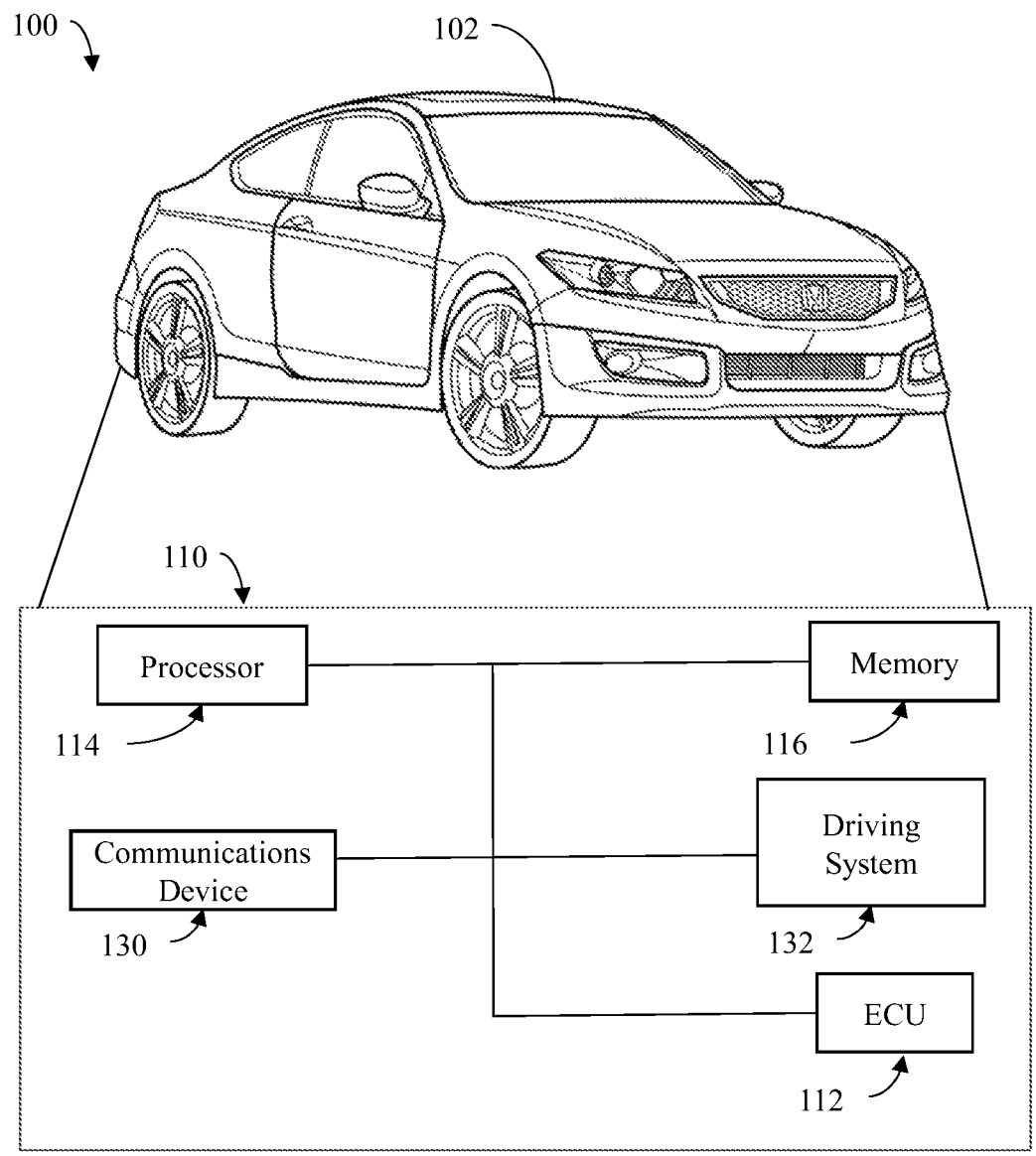
FIG. 1 illustrates a schematic view of an exemplary operating environment of a vehicle system in accordance with aspects of the present disclosure.

Generally described, the present disclosure provides systems and methods for authorizing a real-time transaction with a third party platform in accordance with aspects of the present disclosure. Turning to FIG. 1, a schematic view of an exemplary operating environment 100 of a vehicle system 110 according to an aspect of the disclosure is provided. The vehicle system 110 may reside within a vehicle 102. The components of the vehicle system 110, as well as the components of other systems, hardware architectures, and software architectures discussed herein, may be combined, omitted or organized into various implementations.

The vehicle system 110 may generally include an electronic control unit (ECU) 112 that operably controls a plurality of vehicle systems. The ECU 112 may include internal processing memory, an interface circuit, and bus lines for transferring data, sending commands, and communicating with the vehicle systems, such as driving system 132. The ECU 112 may include an internal processor and memory, not shown. The vehicle 102 may also include a bus for sending data internally among the various components of the vehicle system 110. The driving system 132 may be, for example, any system that provides access to the vehicle 102. For example, the driving system 132 may be a system that may unlock doors of the vehicle 102, open a trunk of the vehicle 102, open a gas tank/charging port of the vehicle 102, and/or remotely start the vehicle 102. It should be understood that these are merely example of driving systems and that other driving systems are contemplated in accordance with aspects of the present disclosure.

Figure 2:
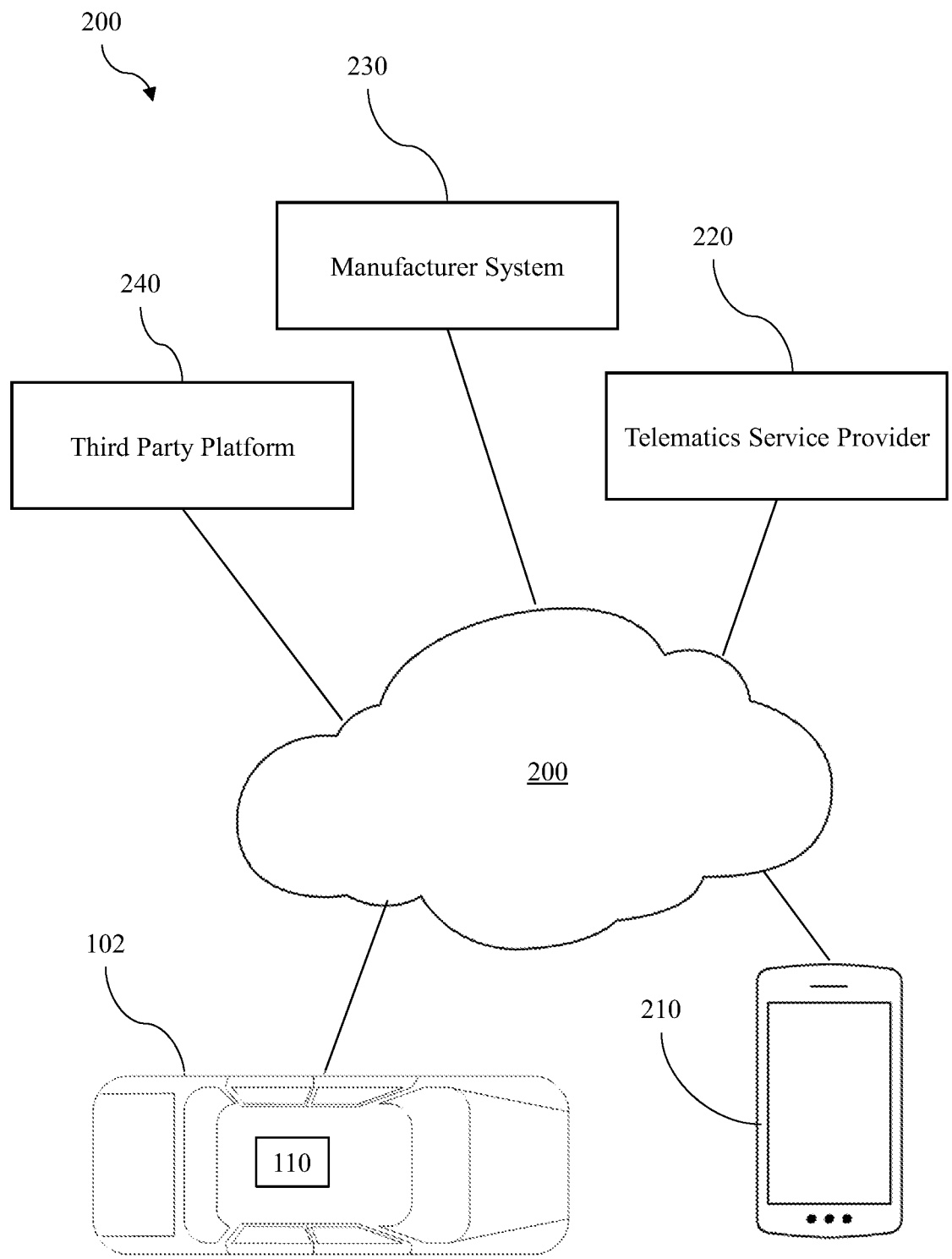
FIG. 2 illustrates an exemplary network for authorizing a real-time transaction with a third party platform in accordance with aspects of the present disclosure.

The vehicle system 110 may also include a processor 114 and a memory 116 that communicate with a communications device 130 and the driver system 132. The communications device 130 (e.g., wireless modem) may provide wired or wireless computer communications utilizing various protocols to send/receive electronic signals internally with respect to features and systems within the vehicle 102 and with respect to external devices. For example, the communications device 130 may wirelessly communicate with a manufacturer system, as illustrated in FIG. 2. These protocols may include a wireless system utilizing radio-frequency (RF) communications (e.g., IEEE 802.11 (Wi-Fi), IEEE 802.15.1 (Bluetooth®)), a near field communication system (NFC) (e.g., ISO 13157), a local area network (LAN), a wireless wide area network (WWAN) (e.g., cellular) and/or a point-to-point system. Additionally, the communications device 130 of the vehicle 102 may be operably connected for internal computer communication via a bus (e.g., a CAN or a LIN protocol bus) to facilitate data input and output between the electronic control unit 112 and vehicle features and systems. In an aspect, the communications device 130 may be configured for vehicle-to-vehicle (V2V) communications, vehicle-to-pedestrian (V2P) communications, and/or vehicle-to-anything (V2X) communications. For example, V2V, V2P, and V2X communications may include wireless communications over a reserved frequency spectrum. As another example, V2V, V2P, and V2X communications may include an ad hoc network between vehicles set up using Wi-Fi or Bluetooth®.

FIG. 2 illustrates an exemplary network 200 for managing the vehicle system 110. The network 200 may be a communications network that facilitates communications between multiple systems. For example, the network 200 may include the Internet or another Internet Protocol (IP) based network. The network 200 may enable the vehicle system 110 to communicate with a manufacturer system 230, a third party platform (TPP) system 240, a telematics service provider (TSP) system 220. Although FIG. 2 illustrates a single TPP system 240, any number of TPP systems 240 are contemplated in accordance with aspects of the present disclosure. In some aspects, the manufacturer system 230, the TPP system 240, the TSP system 220, and the driver system 132 may include a computer system, as shown with respect to FIG. 3 described below. For example, the manufacturer system 230 may include a memory that stores instructions for executing processes for authorizing a real-time transaction with the TPP, and a processor configured to execute the instructions.

In some aspects, during a registration process, e.g., when a customer uses an application operating on the mobile device 210 to register for a service provided by the TPP system 240 (interchangeably referred to herein as a real-time transaction), the customer may provide vehicle information, e.g., a vehicle identification number (VIN) of the vehicle 102, and a personal identification number (PIN) to the manufacturer system 230. For example, the application may include a link to a webpage where the customer may provide the vehicle information and the PIN to the manufacturer system 230. Additionally, during registration, the customer may provide an authorization token to the manufacturer system 230 indicating that the TPP system 240 may provide services to the vehicle 102.

Upon receipt of the vehicle information, the PIN, and/or the authorization token, the manufacturer system 230 may authenticate the PIN by communicating with the TSP system 220. After authenticating the PIN, the manufacturer system 230 may generate a tokenized PIN that may be used by the TPP system 240 to provide services to the vehicle 102. For example, generating the tokenized PIN may include encrypting the PIN received from the customer. In some aspects, the encrypting may be based on an Advanced Encryption Standard (AES) process. In some aspects, the AES process may be a symmetric-key process that utilizes the same key when encrypting the customer PIN and decrypting the tokenized PIN. In further aspects, generating the tokenized PIN may include encrypting the PIN by concatenating the PIN with a key and a SALT. For example, in some aspects, the SALT may be random data that is used as an additional input to a one-way function that hashes the PIN received from the user, and the key may be a random string of bits for scrambling and unscrambling the PIN. The AES process is merely an example process and that other processes are further contemplated in accordance with aspects of the present disclosure.

In some aspects, the manufacturer system 230 may transmit the customer authorization token and the tokenized PIN to the TPP system 240, which may store the customer authorization token and the tokenized PIN. However, in some aspects, the manufacturer system 230 may not store the tokenized PIN after transmitting the tokenized PIN to the TPP system 240. That is, the manufacturer system 230 may delete the tokenized PIN and the customer PIN from any storage devices/memory devices of the manufacturer system 230. In this way, the manufacturer system 230 may, for example, comply with regulations that prohibit the manufacturer system 230 from storing the customer PIN.

After storing the customer authorization token and the tokenized PIN, the TPP system 240 may receive a request from the customer for a service, such as delivery of a product to the vehicle 102, charging and/or fueling the vehicle 102, and washing the vehicle 102, among other services. For example, the request for service may be received from the customer using the application operating on the mobile device 210, which may require that the vehicle 102 be accessible to the TPP. When the requested service is ready, the TPP system 240 may transmit a command requesting access to the vehicle 102 to the manufacturer system 230, along with the customer authorization token and tokenized PIN. In some aspects, the TPP system 240 may use the same tokenized PIN for each service requested by the customer. For example, if the customer submits a request for service daily, weekly, monthly, etc., the TPP system 240 may use the same tokenized PIN for each request.

In response to receiving the command from the TPP system 240, the manufacturer system 230 may validate the customer authorization token, and when validated, the manufacturer system 230 may extract the customer PIN by decrypting the tokenized PIN. For example, as discussed above, the AES process may be a symmetric-key process, and such, the manufacturer system 230 may execute the AES process to decrypt the tokenized PIN. The manufacturer system 230 may then transmit the decrypted PIN and a command to provide access to the vehicle 102 to the TSP system 220, which may in turn remotely provide access the vehicle 102 such that the TPP may render the requested service.

In further aspects, the tokenized PIN may be deactivated or removed from storage by the TPP system 240 in response to the customer suspending or terminating their account with the TPP. In this way, the tokenized PIN may no longer be used for any subsequent requests from customer. In some aspects, the manufacturer system 230 may create another tokenized PIN using the processes described herein in the event that the customer reregisters with the TPP.

Using the processes described herein, the manufacturer system 230 may provide a seamless customer experience. For example, after registering with the TPP and providing the customer authorization token and PIN to the manufacturer system, the customer may request a service from the TPP, and access to the vehicle 102 may be granted without any further interaction from the customer. In addition, the processes described herein provide for a seamless customer experience while also providing additional security to the customer. Specifically, none of the manufacturer system 230, TSP system 220, and the TPP system 240 store the customer PIN. Instead, only the TPP system 240 stores the tokenized PIN, such that even if the TPP system 240 were compromised, the TPP system 240 alone could not provide access the vehicle 102. Similarly, as the manufacturer system 230 does not store either the customer PIN or the tokenized PIN, even if the manufacturer system 230 were compromised, the manufacturer system 230 alone could not provide access the vehicle 102. Thus, the present disclosure provides for a seamless customer experience while also providing additional security to the customer.

Figure 3:
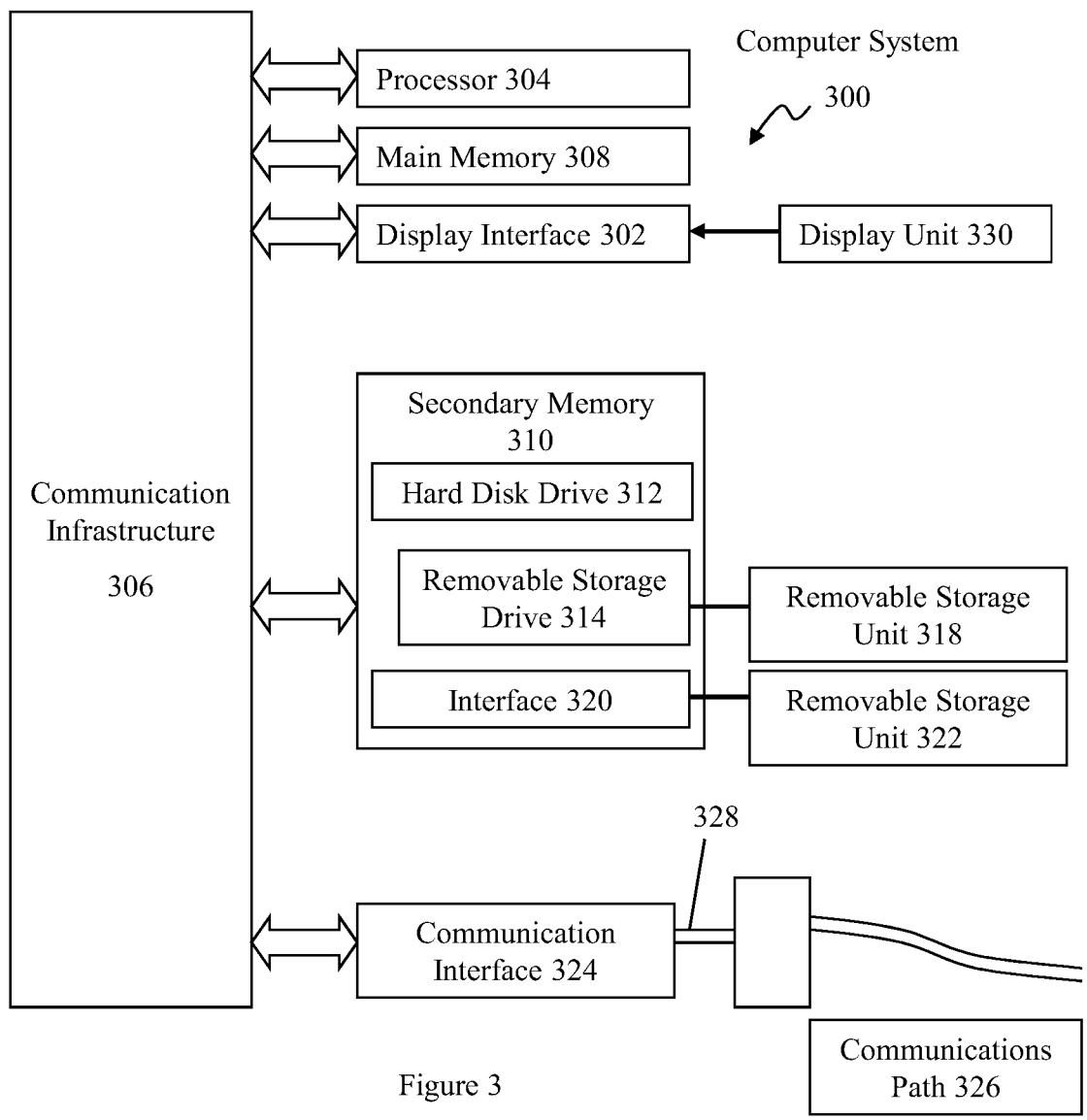
FIG. 3 illustrates various features of an exemplary computer system for use in conjunction with aspects of the present disclosure.

Aspects of the present disclosure may be implemented using hardware, software, or a combination thereof and may be implemented in one or more computer systems or other processing systems. In an aspect of the present disclosure, features are directed toward one or more computer systems capable of carrying out the functionality described herein. An example of such a computer system 300 is shown in FIG. 3.

Computer system 300 includes one or more processors, such as processor 304.

The processor 304 is connected to a communication infrastructure 306 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Computer system 300 may include a display interface 302 that forwards graphics, text, and other data from the communication infrastructure 306 (or from a frame buffer not shown) for display on a display unit 330. Computer system 300 also includes a main memory 308, preferably random access memory (RAM), and may also include a secondary memory 310. The secondary memory 310 may include, for example, a hard disk drive 312, and/or a removable storage drive 314, representing a floppy disk drive, a magnetic tape drive, an optical disk drive, a universal serial bus (USB) flash drive, etc. The removable storage drive 314 reads from and/or writes to a removable storage unit 318 in a well-known manner. Removable storage unit 318 represents a floppy disk, magnetic tape, optical disk, USB flash drive etc., which is read by and written to removable storage drive 314. As will be appreciated, the removable storage unit 318 includes a computer usable storage medium having stored therein computer software and/or data.

Alternative aspects of the present disclosure may include secondary memory 310 and may include other similar devices for allowing computer programs or other instructions to be loaded into computer system 300. Such devices may include, for example, a removable storage unit 322 and an interface 320. Examples of such may include a program cartridge and cartridge interface (such as that found in video game devices), a removable memory chip (such as an erasable programmable read only memory (EPROM), or programmable read only memory (PROM)) and associated socket, and other removable storage units 322 and interfaces 320, which allow software and data to be transferred from the removable storage unit 322 to computer system 300.

Computer system 300 may also include a communications interface 324.

Communications interface 324 allows software and data to be transferred between computer system 300 and external devices. Examples of communications interface 324 may include a modem, a network interface (such as an Ethernet card), a communications port, a Personal Computer Memory Card International Association (PCMCIA) slot and card, etc. Software and data transferred via communications interface 324 are in the form of signals 328, which may be electronic, electromagnetic, optical or other signals capable of being received by communications interface 324. These signals 328 are provided to communications interface 324 via a communications path (e.g., channel) 326. This path 326 carries signals 328 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 318, a hard disk installed in hard disk drive 312, and signals 328. These computer program products provide software to the computer system 300. Aspects of the present disclosure are directed to such computer program products.

Computer programs (also referred to as computer control logic) are stored in main memory 308 and/or secondary memory 310. Computer programs may also be received via communications interface 324. Such computer programs, when executed, enable the computer system 300 to perform the features in accordance with aspects of the present disclosure, as discussed herein. In particular, the computer programs, when executed, enable the processor 304 to perform the features in accordance with aspects of the present disclosure. Accordingly, such computer programs represent controllers of the computer system 300.

In an aspect of the present disclosure where the disclosure is implemented using software, the software may be stored in a computer program product and loaded into computer system 300 using removable storage drive 314, hard drive 312, or communications interface 320. The control logic (software), when executed by the processor 304, causes the processor 304 to perform the functions described herein. In another aspect of the present disclosure, the system is implemented primarily in hardware using, for example, hardware components, such as application specific integrated circuits (ASICs). Implementation of the hardware state machine so as to perform the functions described herein will be apparent to persons skilled in the relevant art(s).

Figure 4:
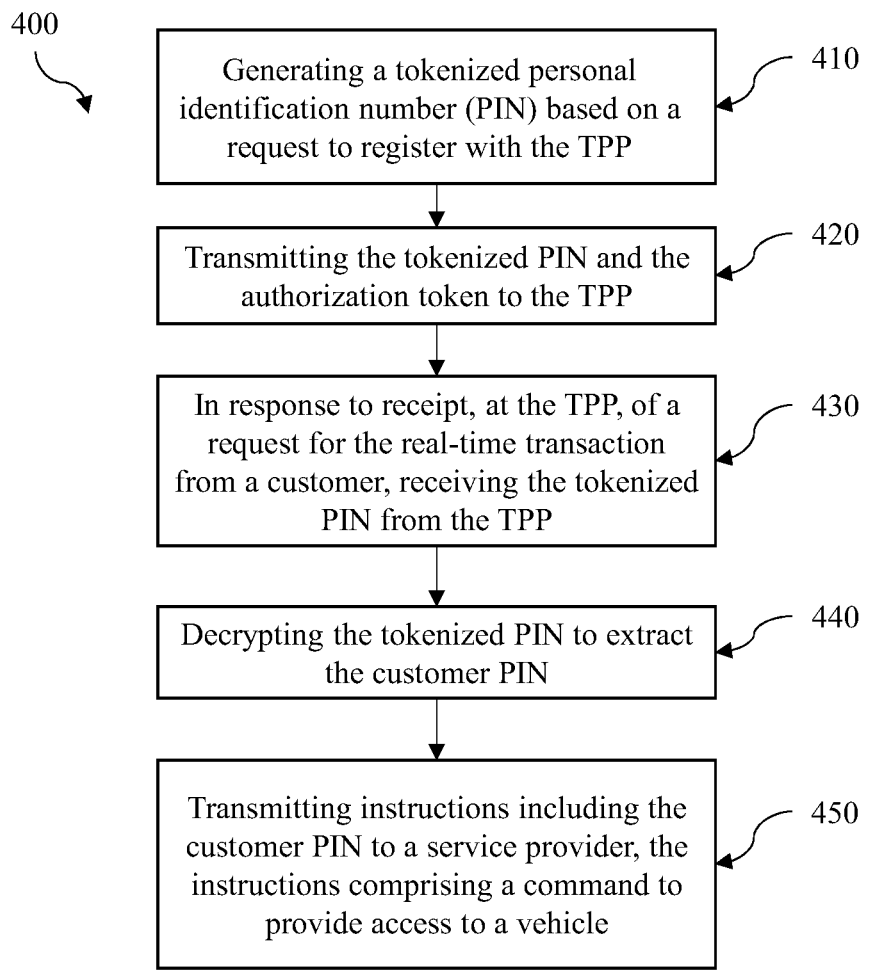
FIG. 4 illustrates an exemplary flowchart for authorizing a real-time transaction with a third party platform in accordance with aspects of the present disclosure.

FIG. 4 illustrates a flowchart for authorizing a real-time transaction with a third party platform. In some aspects, the method may include generating a tokenized personal identification number (PIN) based on a request to register with the TPP, the request including a customer PIN and an authorization token 410. For example, during a registration process, a customer may use an application operating on a mobile device to register for a service provided by the TPP. During registration, the customer may provide vehicle information, such as a VIN, and the customer PIN to a manufacturer system via a webpage that may be accessed using the application. Additionally, during registration, the customer may provide an authorization token to the manufacturer system indicating that the TPP may provide services to the vehicle. After validating the customer PIN, the tokenized PIN may be generated by encrypting the customer PIN received. In some aspects, the encrypting may be based on an Advanced Encryption Standard (AES) process. In some aspects, the AES process may be a symmetric-key process that utilizes the same key when encrypting the customer PIN and decrypting the tokenized PIN. In further aspects, generating the tokenized PIN may include encrypting the PIN by concatenating the PIN with a key and a SALT.

The method may also include transmitting the tokenized PIN and the authorization token to the TPP, wherein the TPP stores the tokenized PIN and the authorization token 420. For example, the manufacturer system may transmit the customer authorization token and the tokenized PIN to the TPP, which may store the customer authorization token and the tokenized PIN. However, in some aspects, the manufacturer system may not store the tokenized PIN after transmitting the tokenized PIN to the TPP system. That is, the manufacturer system may delete the tokenized PIN and the customer PIN from any storage devices/memory devices of the manufacturer system.

The method may further include in response to receipt, at the TPP, of a request for the real-time transaction from a customer, receiving the tokenized PIN from the TPP 430. For example, the TPP system may receive a request from the customer for a service via the application operating on the mobile device. When the requested service is ready, the TPP system may transmit a command requesting access to the vehicle to the manufacturer system along with the customer authorization token and tokenized PIN. In some aspects, the TPP may use the same tokenized PIN for each service requested by the customer. For example, if the customer submits a request for service daily, weekly, monthly, etc., the TPP system 240 may use the same tokenized PIN for each request.

The method may also include decrypting the tokenized PIN to extract the customer PIN 440. For example, in response to receiving the command from the TPP, the manufacturer system may validate the customer authorization token, and when validated, the manufacturer system may extract the customer PIN by decrypting the tokenized PIN using the AES process described herein. The method may further include transmitting instructions including the customer PIN to a service provider, the instructions comprising a command to provide access to a vehicle 450. For example, after decrypting the tokenized PIN, the manufacturer system may transmit the decrypted PIN and a command to provide access to the vehicle to the TSP, which may remotely provide access the vehicle such that the TPP may render the requested service.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A system comprising:
a memory that stores instructions for authorizing a real-time transaction with a third party platform (TPP); and
a processor configured to execute the instructions, wherein the instructions cause the processor to:
receive, from an application, a request to register the TPP to provide services to a vehicle of a customer, wherein the request includes a customer personal identification number (PIN) and an authorization token;
generate a tokenized PIN from the customer PIN received in the request to register the TPP;
transmit the tokenized PIN and the authorization token to the TPP;
receive, from the TPP based on a request for a real-time transaction for the customer, an access request to access the vehicle, wherein the access request indicates the tokenized PIN;
extract the customer PIN from the tokenized PIN; and
transmit instructions including the customer PIN, as extracted from the tokenized PIN, to a telematics service provider that is different than the TPP and provides access to the vehicle, the instructions comprising a command to provide access to the vehicle based on the access request.

2. The system of claim 1, wherein generating the tokenized PIN comprises encrypting the customer PIN and extracting the customer PIN comprises decrypting the tokenized PIN.

3. The system of claim 2, wherein encrypting the customer PIN comprises concatenating the customer PIN with a key and a SALT.

4. The system of claim 2, wherein the encrypting the customer PIN and decrypting the tokenized PIN are based on a symmetric-key process that utilizes a common key.

5. The system of claim 1, wherein the instructions further cause the processor to validate the authorization token after receiving the tokenized PIN from the TPP.

6. The system of claim 1, wherein generating the tokenized PIN is based on validating, with the telematics service provider, the customer PIN received in the request to register the TPP.

7. The system of claim 1, wherein the instructions further cause the processor to delete the tokenized PIN and the customer PIN from the memory after transmitting the tokenized PIN and the authorization token to the TPP.

8. A method for authorizing a real-time transaction with a third party platform (TPP) comprising:
receiving, from an application, a request to register the TPP to provide services to a vehicle of a customer, wherein the request includes a customer personal identification number (PIN) and an authorization token;
generating a tokenized PIN from the customer PIN received in the request to register the TPP;
transmitting the tokenized PIN and the authorization token to the TPP;
receiving, from the TPP based on a request for a real-time transaction for the customer, an access request to access the vehicle, wherein the access request indicates the tokenized PIN;
extracting the customer PIN from the tokenized PIN; and
transmitting instructions including the customer PIN, as extracted from the tokenized PIN, to a telematics service provider that is different than the TPP and provides access to the vehicle, the instructions comprising a command to provide access to the vehicle based on the access request.

9. The method of claim 8, wherein generating the tokenized PIN comprises encrypting the customer PIN and extracting the customer PIN comprises decrypting the tokenized PIN.

10. The method of claim 9, wherein encrypting the customer PIN comprises concatenating the customer PIN with a key and a SALT.

11. The method of claim 9, wherein the encrypting the customer PIN and decrypting the tokenized PIN are based on a symmetric-key process that utilizes a common key.

12. The method of claim 8, further comprising validating the authorization token after receiving the tokenized PIN from the TPP.

13. The method of claim 8, wherein generating the tokenized PIN is based on validating, with the telematics service provider, the customer PIN received in the request to register the TPP.

14. The method of claim 8, further comprising deleting the tokenized PIN and the customer PIN from a memory after transmitting the tokenized PIN and the authorization token to the TPP.

15. A non-transitory computer-readable storage medium containing executable computer program code, the code comprising instructions configured to cause a processor to:
receive, from an application, a request to register the TPP to provide services to a vehicle of a customer, wherein the request includes a customer personal identification number (PIN) and an authorization token;
generate a tokenized PIN from the customer PIN received in the request to register the TPP;
transmit the tokenized PIN and the authorization token to the TPP;
receive, from the TPP based on a request for a real-time transaction for the customer, an access request to access the vehicle, wherein the access request indicates the tokenized PIN;
extract the customer PIN from the tokenized PIN; and
transmit instructions including the customer PIN, as extracted from the tokenized PIN, to a telematics service provider that is different than the TPP and provides access to the vehicle, the instructions comprising a command to provide access to the vehicle based on the access request.

16. The medium of claim 15, wherein generating the tokenized PIN comprises encrypting the customer PIN and extracting the customer PIN comprises decrypting the tokenized PIN.

17. The medium of claim 16, wherein the encrypting the customer PIN and decrypting the tokenized PIN are based on a symmetric-key process that utilizes the key when encrypting the customer PIN and decrypting the tokenized PIN.

18. The medium of claim 15, wherein, the code further causes the processor to validate the authorization token after receiving the tokenized PIN from the TPP.

19. The medium of claim 15, wherein generating the tokenized PIN is based on validating, with the telematics service provider, the customer PIN received in the request to register the TPP.

20. The medium of claim 15, wherein the code further causes the processor to delete the tokenized PIN and the customer PIN from a memory after transmitting the tokenized PIN and the authorization token to the TPP.

* * * * *